US012486696B1

(12) United States Patent
Rietz et al.

(10) Patent No.: US 12,486,696 B1
(45) Date of Patent: Dec. 2, 2025

(54) FENESTRATION UNIT WITH SASH RETENTION APPARATUS AND METHODS

(71) Applicant: ANDERSEN CORPORATION, Bayport, MN (US)

(72) Inventors: Adam Rietz, Lakeland, MN (US); Allen DaRonco, Somerset, WI (US); Christopher Hanson, Fridley, MN (US)

(73) Assignee: Andersen Corporation, Bayport, MN (US)

(*) Notice: Subject to any disclaimer, the term of this patent is extended or adjusted under 35 U.S.C. 154(b) by 185 days.

(21) Appl. No.: 18/520,786

(22) Filed: Nov. 28, 2023

Related U.S. Application Data

(60) Provisional application No. 63/441,541, filed on Jan. 27, 2023.

(51) Int. Cl.
*E05B 65/08* (2006.01)
*E06B 5/10* (2006.01)

(52) U.S. Cl.
CPC ............ *E05B 65/0882* (2013.01); *E06B 5/10* (2013.01)

(58) Field of Classification Search
CPC ............................... E05B 65/0882; E06B 5/10
See application file for complete search history.

(56) References Cited

U.S. PATENT DOCUMENTS

| | | | | |
|---|---|---|---|---|
| 3,745,706 A | | 7/1973 | Stermac | |
| 4,526,412 A | | 7/1985 | Gist | |
| 6,363,659 B1 | | 4/2002 | Wang | |
| 6,434,789 B1 | | 8/2002 | Kruse | |
| 7,555,871 B1 | | 7/2009 | Neal | |
| 9,347,255 B2 | * | 5/2016 | Benevenga | E06B 3/44 |
| 11,939,811 B2 | * | 3/2024 | Johnson | E06B 3/9687 |
| 2005/0155301 A1 | | 7/2005 | Hapka et al. | |
| 2014/0373464 A1 | * | 12/2014 | Benevenga | E06B 3/44 49/449 |
| 2023/0151654 A1 | * | 5/2023 | Johnson | E05C 9/04 52/204.5 |
| 2023/0151676 A1 | * | 5/2023 | Johnson | E06B 3/4415 52/204.5 |
| 2023/0151677 A1 | * | 5/2023 | Johnson | E06B 3/9647 52/204.5 |

FOREIGN PATENT DOCUMENTS

| | | |
|---|---|---|
| EP | 3252257 A1 | 12/2017 |
| GB | 2453954 A | 10/2007 |

* cited by examiner

*Primary Examiner* — Rodney Mintz
(74) *Attorney, Agent, or Firm* — Mueting Raasch Group

(57) ABSTRACT

Fenestration units including a movable sash located within a fenestration unit frame are described herein. The fenestration units further include structures configured to retain the movable sash within the frame with the structures being configured to form mechanical interlocks with the fenestration unit frame when the movable sash is in a closed position within the fenestration unit frame.

25 Claims, 9 Drawing Sheets

FENESTRATION UNIT WITH SASH RETENTION APPARATUS AND METHODS

RELATED APPLICATION

The present application claims the benefit under 35 U.S.C. § 119 (e) of U.S. Provisional Patent Application 63/441,541 filed on Jan. 27, 2023, which is hereby incorporated by reference in its entirety.

Fenestration units with sash retention apparatus and related methods are described herein.

Fenestration units including a movable sash retained in a fenestration unit frame may rely, at least in part, on the rigid nature of the glass lites of the movable sash to provide rigidity to the movable sash. This may be particularly true when the fenestration units are intended for use in environments in which high-impact events may be expected.

SUMMARY

Fenestration units including a movable sash located within a fenestration unit frame are described herein. The fenestration units further include structures configured to retain the movable sash within the frame with the structures being configured to form mechanical interlocks with the fenestration unit frame when the movable sash is in a closed position within the fenestration unit frame.

Many fenestration units include one or more movable sashes configured to slide within the fenestration unit frame such as sliding/gliding windows, sliding patio doors, single hung windows, double hung windows, etc. In the context of the fenestration units described herein, a movable sash typically includes a glass lite contained within a frame (e.g., sash frame) with the movable sash moving in translation within a fenestration unit frame between its open and closed positions within the frame. The overall rigidity of the movable sash relies, at least in part, on the rigidity of the glass lite contained within the frame. When the rigidity of the glass lite is compromised due to, e.g., breakage, the overall rigidity of the movable sash may also be compromised.

This may be a particular problem when the fenestration unit is designed for use in high-impact applications such as, e.g., events generating wind-borne debris (e.g., hurricanes, cyclones, tornadoes, etc.). The glass lites in movable sashes of fenestration units designed for use in such applications are typically constructed of a glass-polymer composite in which, although the glass portion of the glass lite may be broken or shattered, the glass lite resists punctures or tearing to limit or prevent air or water from passing through the movable sash.

Even though the broken or shattered glass lite resists punctures or tearing, the glass portion of the glass-polymer composite of the glass lite no longer provides mechanical stiffness rigidity to the movable sash as a whole. In such situations, the glass lite may bow or flex sufficiently during pressure cycling (due to, e.g., wind or other forces) to cause the sash frame components (e.g., rails and/or stiles) to bow or flex enough to allow the movable sash to escape from the fenestration unit frame.

One or more embodiments of the fenestration units described herein include structures configured to retain a movable sash within a fenestration unit frame with the structures being configured to form mechanical interlocks between the frame of the movable sash and the fenestration unit frame when the movable sash is in a closed position within the fenestration unit frame. Those mechanical interlocks between the sash frame and the fenestration unit frame can, even after compromise of the glass lite contained within the movable sash, resist forces that might otherwise result in escape of the movable sash from the fenestration unit frame.

The mechanical interlocks formed between the sash frame and the fenestration unit frame are, in one or more embodiments, only formed when the movable sash is in or very near its closed position. In one or more embodiments, the mechanical interlocks are disengaged when the movable sash is moved from its closed position towards its open position to allow for removal of the movable sash from the fenestration unit frame for, e.g., cleaning, replacement, etc.

In one or more embodiments, one or more of the components used to form the mechanical interlocks are preferably concealed when the movable sash is in its closed position and at least partially concealed when the movable sash is in its open position.

In one aspect, one or more embodiments of a fenestration unit as described herein includes: a fenestration unit frame comprising a first side jamb and a second side jamb, wherein the first side jamb is connected to a first end of each of a head jamb and a sill, and wherein the second side jamb is connected to a second end of each of the head jamb and the sill; and a movable sash retained in the fenestration unit frame, wherein the movable sash comprises a sash frame comprising a leading stile and a trailing stile, wherein the leading stile extends between a leading end of a head rail and a leading end of a sill rail and the trailing stile extends between a trailing end of a head rail and a trailing end of a sill rail, and wherein the movable sash is positioned in the fenestration unit frame and configured to move within the fenestration unit frame between the first side jamb and the second side jamb, wherein the movable sash is in a closed position in the fenestration unit frame when the leading stile is adjacent the first side jamb, and wherein the movable sash is in an open position in the fenestration unit frame when the leading stile is spaced apart from the first side jamb. The fenestration unit further includes sash retention apparatus comprising: a frame head component attached to the head jamb proximate the first side jamb such that the frame head component is located between the head rail and the head jamb when the movable sash is in the closed position; a sash head component attached to the sash frame, the sash head component located between the head rail and the head jamb proximate the leading end of the head rail, wherein, when the movable sash is in the closed position, the frame head component engages with the sash head component to form a mechanical interlock between the frame head component and the sash head component such that the sash head component and the leading end of the head rail are restricted from moving away from the frame head component and the head jamb towards the sill; a frame sill component attached to the sill proximate the first side jamb such that the frame sill component is located between the sill rail and the sill proximate the first end of the head jamb when the movable sash is in the closed position; and a sash sill component attached to the sash frame, the sash sill component located between the sill rail and the sill proximate the leading end of the sill, wherein, when the movable sash is in the closed position, the sash sill component engages with the frame sill component to form a mechanical interlock between the sash sill component and the frame sill component such that the sash sill component and the leading end of the sill rail are restricted from moving away from the frame sill component and the sill towards the head jamb.

In one or more embodiments of the fenestration units including sash retention apparatus as described herein, the mechanical interlock between the frame sill component and the sash sill component when the movable sash is in the closed position restricts movement of the leading end of the sill rail out of a plane defined by the fenestration unit frame.

In one or more embodiments of the fenestration units including sash retention apparatus as described herein, the mechanical interlock between the frame head component and the sash head component when the movable sash is in the closed position restricts movement of the leading end of the head rail out of a plane defined by the fenestration unit frame.

In one or more embodiments of the fenestration units including sash retention apparatus as described herein, the mechanical interlock between the frame sill component and the sash sill component when the movable sash is in the closed position restricts movement of the leading end of the sill rail out of a plane defined by the fenestration unit frame; and the mechanical interlock between the frame head component and the sash head component when the movable sash is in the closed position restricts movement of the leading end of the head rail out of a plane defined by the fenestration unit frame.

In one or more embodiments of the fenestration units including sash retention apparatus as described herein, the sash sill component disengages from the frame sill component when the movable sash moves from the closed position to the open position.

In one or more embodiments of the fenestration units including sash retention apparatus as described herein, the sash head component disengages from the frame head component when the movable sash moves from the closed position to the open position. In one or more embodiments of the fenestration units including sash retention apparatus as described herein, the sash sill component disengages from the frame sill component and the sash head component disengages from the frame head component when the movable sash moves from the closed position to the open position. In one or more embodiments, the sash sill component disengages from the frame sill component before the sash head component disengages from the frame head component when the movable sash moves from the closed position to the open position.

In one or more embodiments of the fenestration units including sash retention apparatus as described herein, the movable sash comprises a roller assembly supporting at least a portion of the sill rail of the movable sash above the sill, wherein the sash sill component is located between the roller assembly and the first side jamb. In one or more embodiments, the roller assembly is located closer to the leading stile than the trailing stile.

In one or more embodiments of the fenestration units including sash retention apparatus as described herein, the frame head component comprises a receiving end positioned distal from the first side jamb, wherein the sash head component moves past the receiving end when the movable sash is moving from the open position to the closed position, and wherein, when the movable sash is in the closed position, the receiving end is located closer to the leading stile of the movable sash than the trailing stile of the movable sash. In one or more embodiments, the frame sill component comprises a receiving end positioned distal from the first side jamb, wherein the sash sill component moves past the receiving end of the frame sill component when the movable sash is moving from the open position to the closed position, and wherein a first distance measured along the sill from the receiving end of the frame sill component to the first side jamb is smaller than a second distance measured along the head jamb from the receiving end of the frame head component to the first side jamb.

In one or more embodiments of the fenestration units including sash retention apparatus as described herein, the leading stile of the movable sash comprises a stiffener element configured to increase a resistance of the leading stile to deformation in a direction out of a sash plane defined by the sash frame as compared to a resistance of the trailing stile to deformation in a direction out of the sash plane defined by the sash frame. In one or more embodiments, the stiffener element is located in an interior volume of the leading stile.

In a second aspect, one or more embodiments of a fenestration unit as described herein include: a fenestration unit frame comprising a first side jamb and a second side jamb, wherein the first side jamb is connected to a first end of each of a head jamb and a sill, and wherein the second side jamb is connected to a second end of each of the head jamb and the sill; and a movable sash retained in the fenestration unit frame, wherein the movable sash comprises a sash frame comprising a leading stile and a trailing stile, wherein the leading stile extends between a leading end of a head rail and a leading end of a sill rail and the trailing stile extends between a trailing end of a head rail and a trailing end of a sill rail, and wherein the movable sash is positioned in the fenestration unit frame and configured to move within the fenestration unit frame between the first side jamb and the second side jamb, wherein the movable sash is in a closed position in the fenestration unit frame when the leading stile is adjacent the first side jamb, and wherein the movable sash is in an open position in the fenestration unit frame when the leading stile is spaced apart from the first side jamb. The fenestration unit further includes sash retention apparatus comprising: a frame head component attached to the head jamb proximate the first side jamb such that the frame head component is located between the head rail and the head jamb when the movable sash is in the closed position; a sash head component attached to the sash frame, the sash head component located between the head rail and the head jamb proximate the leading end of the head rail, wherein, when the movable sash is in the closed position, the frame head component engages with the sash head component to form a mechanical interlock between the frame head component and the sash head component such that the sash head component and the leading end of the head rail are restricted from moving away from the frame head component and the head jamb towards the sill, and wherein the mechanical interlock between the frame head component and the sash head component restricts movement of the leading end of the head rail out of a plane defined by the fenestration unit frame; a frame sill component attached to the sill proximate the first side jamb such that the frame sill component is located between the sill rail and the sill proximate the first end of the head jamb when the movable sash is in the closed position; and a sash sill component attached to the sash frame, the sash sill component located between the sill rail and the sill proximate the leading end of the sill, wherein, when the movable sash is in the closed position, the sash sill component engages with the frame sill component to form a mechanical interlock between the sash sill component and the frame sill component such that the sash sill component and the leading end of the sill rail are restricted from moving away from the frame sill component and the sill towards the head jamb, and wherein the mechanical interlock between the frame sill component and the sash sill component restricts movement of the leading end of the sill rail out of a plane defined by the fenestration unit frame; wherein the sash sill component disengages from the frame sill component when the movable sash moves from the closed position to the open position; wherein the sash head component disengages from the frame head component when the movable sash moves from the closed position to the open position; and wherein the sash sill component disengages from the frame sill component before the sash head component disengages from the frame head component when the movable sash moves from the closed position to the open position.

In one or more embodiments of the fenestration units including sash retention apparatus as described herein, the movable sash comprises a roller assembly supporting at least a portion of the sill rail of the movable sash above the sill, wherein the sash sill component is located between the roller assembly and the first side jamb. In one or more embodiments, the roller assembly is located closer to the leading stile than the trailing stile.

In one or more embodiments of the fenestration units including sash retention apparatus as described herein, the frame head component comprises a receiving end positioned distal from the first side jamb, wherein the sash head component moves past the receiving end when the movable sash is moving from the open position to the closed position, and wherein, when the movable sash is in the closed position, the receiving end is located closer to the leading stile of the movable sash than the trailing stile of the movable sash. In one or more embodiments, the frame sill component comprises a receiving end positioned distal from the first side jamb, wherein the sash sill component moves past the receiving end of the frame sill component when the movable sash is moving from the open position to the closed position, and wherein a first distance measured along the sill from the receiving end of the frame sill component to the first side jamb is smaller than a second distance measured along the head jamb from the receiving end of the frame head component to the first side jamb.

In one or more embodiments of the fenestration units including sash retention apparatus as described herein, the leading stile of the movable sash comprises a stiffener element configured to increase a resistance of the leading stile to deformation in a direction out of a sash plane defined by the sash frame as compared to a resistance of the trailing stile to deformation in a direction out of the sash plane defined by the sash frame. In one or more embodiments, the stiffener element is located in an interior volume of the leading stile.

In a third aspect, one or more embodiments of a fenestration unit as described herein include: a fenestration unit frame comprising a first side jamb and a second side jamb, wherein the first side jamb is connected to a first end of each of a head jamb and a sill, and wherein the second side jamb is connected to a second end of each of the head jamb and the sill; a movable sash retained in the fenestration unit frame, wherein the movable sash comprises a sash frame comprising a leading stile and a trailing stile, wherein the leading stile extends between a leading end of a head rail and a leading end of a sill rail and the trailing stile extends between a trailing end of a head rail and a trailing end of a sill rail, and wherein the movable sash is positioned in the fenestration unit frame and configured to move within the fenestration unit frame between the first side jamb and the second side jamb, wherein the movable sash is in a closed position in the fenestration unit frame when the leading stile is adjacent the first side jamb, and wherein the movable sash is in an open position in the fenestration unit frame when the leading stile is spaced apart from the first side jamb; a first mechanical interlock between the leading end of the head rail and the head jamb when the movable sash is in the closed position, wherein the first mechanical interlock is configured to restrict the leading end of the head rail from moving away from the head jamb and towards the sill, and wherein the first mechanical interlock is configured to disengage when the movable sash moves from the closed position to the open position; and a second mechanical interlock between the leading end of the sill rail and the sill when the movable sash is in the closed position, wherein the second mechanical interlock is configured to restrict the leading end of the sill rail from moving away from the sill and towards the head jamb, and wherein the second mechanical interlock is configured to disengage when the movable sash moves from the closed position to the open position.

In one or more embodiments of the fenestration units including first and second mechanical interlocks as described herein, the second mechanical interlock is configured to restrict movement of the leading end of the sill rail out of a plane defined by the fenestration unit frame.

In one or more embodiments of the fenestration units including first and second mechanical interlocks as described herein, the first mechanical interlock is configured to restrict movement of the leading end of the head rail out of a plane defined by the fenestration unit frame.

In one or more embodiments of the fenestration units including first and second mechanical interlocks as described herein, the second mechanical interlock is configured to restrict movement of the leading end of the sill rail out of a plane defined by the fenestration unit frame; and the first mechanical interlock is configured to restrict movement of the leading end of the head rail out of a plane defined by the fenestration unit frame.

In one or more embodiments of the fenestration units including first and second mechanical interlocks as described herein, the second mechanical interlock is configured to disengage when the movable sash moves from the closed position to the open position.

In one or more embodiments of the fenestration units including first and second mechanical interlocks as described herein, the first mechanical interlock is configured to disengage when the movable sash moves from the closed position to the open position.

In one or more embodiments of the fenestration units including first and second mechanical interlocks as described herein, the second mechanical interlock is configured to disengage before the first mechanical interlock disengages when the movable sash moves from the closed position to the open position.

In one or more embodiments of the fenestration units including first and second mechanical interlocks as described herein, the first mechanical interlock is configured to engage before the second mechanical interlock engages when the movable sash moves from the open position to the closed position.

In one or more embodiments of the fenestration units including first and second mechanical interlocks as described herein, the movable sash comprises a roller assembly supporting at least a portion of the sill rail of the movable sash above the sill, wherein the second mechanical interlock is formed between the roller assembly and the first side jamb. In one or more embodiments, the roller assembly is located closer to the leading stile than the trailing stile.

In one or more embodiments of the fenestration units including first and second mechanical interlocks as described herein, the leading stile of the movable sash comprises a stiffener element configured to increase a resistance of the leading stile to deformation in a direction out of a sash plane defined by the sash frame as compared to a resistance of the trailing stile to deformation in a direction out of the sash plane defined by the sash frame. In one or more embodiments, the stiffener element is located in an interior volume of the leading stile.

Where used herein, positional terms such as "top," "bottom," "above," "below," etc. are used for reference relative to each other when the fenestration units are installed in a building opening. These terms should not be construed narrowly and may, in actual use, be reversed. For example, a first component described as being above a second component may, in actual use, be located below the second component. Furthermore, in one or more embodiments, components described as, e.g., side jambs, head jambs, sills, rails, stiles, etc. may be found in any orientation of the fenestration units described herein. For example, components described as a side jamb may, in one or more embodiments, be found at the top or bottom of a fenestration unit as installed while the head jamb and still of the fenestration unit are found on the sides of the fenestration unit as installed. Such relational terms are used only out of convenience and should not be construed as limiting the claims.

Where used herein, the terms "exterior" and "interior" are used only in a relative sense, for example, an exterior surface and an interior surface may be used to describe surfaces located on opposite sides of a fenestration unit. In actual use, and exterior surface could be found within the interior of a building or other structure where the surface would conventionally be defined as an interior surface, while an interior surface could be found outside of a building or other structure where the surface would conventionally be defined as an exterior surface.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the fenestration units and related methods as described herein. Rather, a more complete understanding of the invention will become apparent and appreciated by reference to the following Description of Illustrative Embodiments and claims in view of the accompanying figures of the drawing.

BRIEF DESCRIPTION OF THE VIEWS OF THE DRAWING

Each of the figures described herein include axes corresponding to a three-dimensional Cartesian coordinate system to facilitate an understanding of the illustrative embodiments of the invention depicted in the figures and described herein.

DESCRIPTION OF ILLUSTRATIVE EMBODIMENTS

Figure 1:
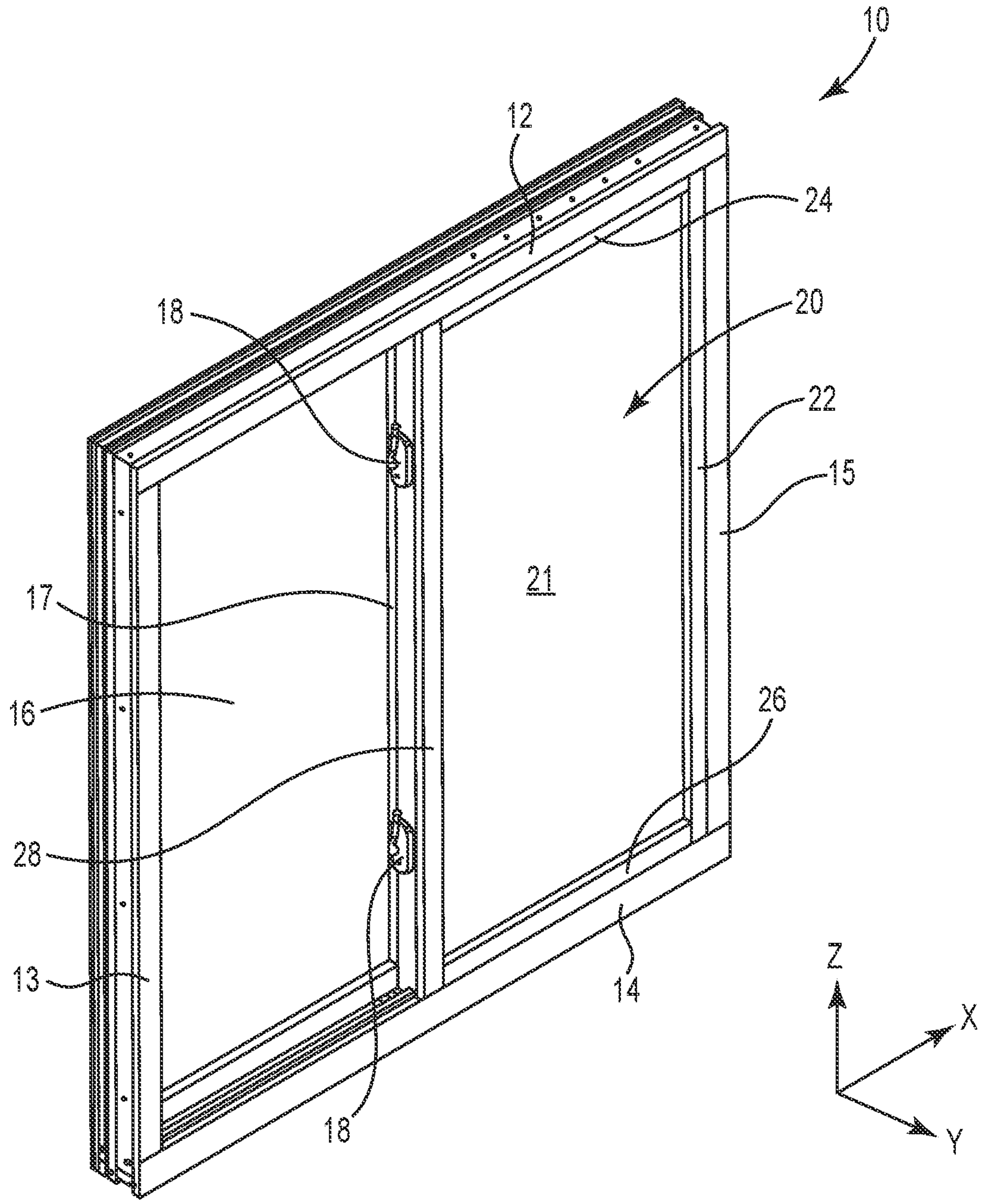
FIG. 1 is a perspective view of one illustrative embodiment of a fenestration unit including a movable sash as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

One illustrative embodiment of a fenestration unit as described herein is depicted in a perspective view in FIG. 1. The fenestration unit 10 includes a fenestration unit frame and a movable sash retained in the fenestration unit frame. The fenestration unit frame includes a head jamb 12, sill 14, along with side jambs 13 and 15. The depicted illustrative embodiment of fenestration unit 10 includes a stationary sash 16 and a movable sash 20 in the fenestration unit frame although it should be understood the alternative embodiments of fenestration units may include two (or possibly more) movable sashes and the sash retention apparatus described herein may be used with each movable sash in any fenestration unit.

The movable sash 20 includes a leading stile 22 and a trailing stile 28 along with a head rail 24 and a sill rail 26. Together, the stiles 22 and 28 along with rails 24 and 26 form a sash frame containing a glass lite 21. The glass lite 21 may take the form of, for example, a multi-pane construction including two or more distinct transparent or translucent panels attached to each other along their edges to form an insulated glass (IG) unit contained within the sash frame. As discussed herein, the glass lite 21 as a whole may be impact resistant although, in one or more embodiments, it may be sufficient that only one of the distinct panels of the glass lite 21 may be constructed to be impact resistant. As used herein, the term “impact resistant” (and variations thereof) means that the fenestration unit meets or exceeds impact certification and/or code requirements for use in some coastal or other locations.

The head rail 24 moves along the head jamb 12 of the fenestration unit frame while the sill rail 26 moves along the sill 14 of the fenestration unit frame as the movable sash moves between its open and closed positions. As depicted in FIG. 1, the movable sash 20 is in its closed position within the fenestration unit frame. When in the closed position the leading stile 22 of the movable sash 20 is adjacent the side jamb 15 of the fenestration unit frame. In the depicted illustrative embodiment, the trailing stile 28 of movable sash 20 is located adjacent a locking stile 17 of stationary sash 16 when the movable sash 20 is in its closed position. Also in the depicted illustrative embodiment, a pair of sash locks 18 are positioned at the junction between the trailing stile 28 of movable sash 20 and the locking stile 17 of stationary sash 16 to allow for locking of the movable sash 20 in its closed position.

The depicted illustrative embodiment of fenestration unit 10 is in the form of a sliding window unit. Fenestration units described herein may, however, take a variety of forms or formats including, but not limited to, sliding patio doors, single hung windows, double hung windows, etc. As such, movement of a movable sash between open and closed positions within a fenestration unit frame of the fenestration units described herein may be vertically or horizontally (with respect to the direction of gravity).

In one or more embodiments of the fenestration units described herein, the movable sash may be defined as including a sash frame in which a glass lite is contained. In one or more embodiments, the glass lite occupies a substantial majority of the major surfaces of the movable sash with the sash frame components occupying 20% or less, 15% or less, or 10% or less of the major surfaces of the movable sash with no intermediate support provided between the sash frame components to restrain the glass lite after it is compromised. As described herein, the major surfaces of the movable sash are those surfaces that lie essentially within the X-Z planes of the illustrative embodiments depicted in the figures.

Figure 2:
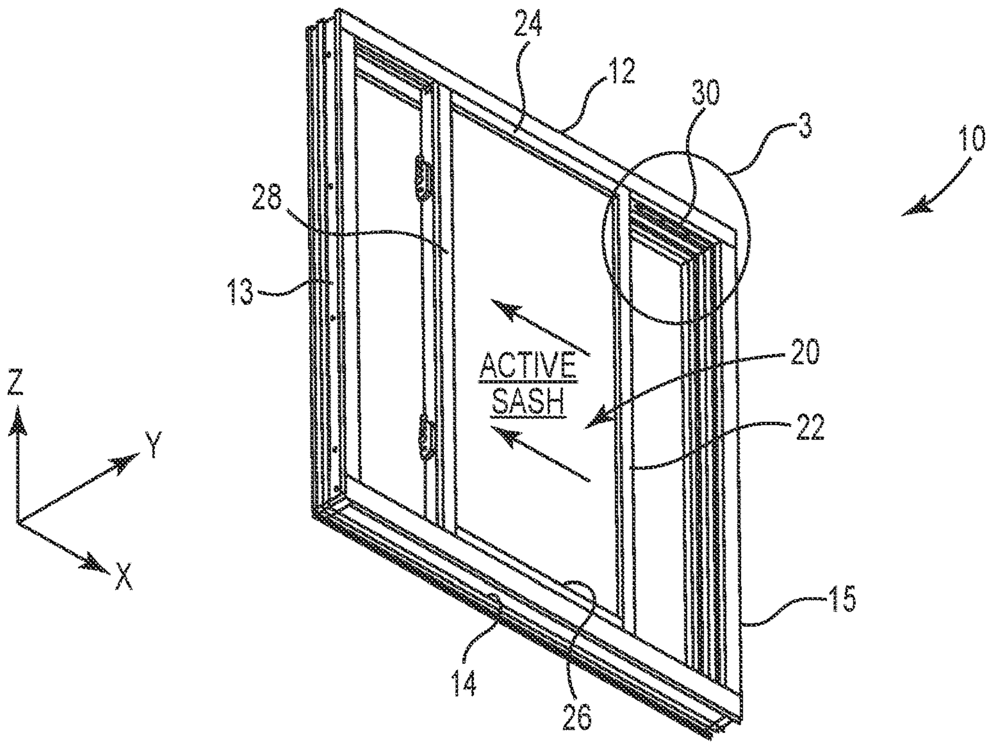
FIG. 2 is another perspective view of the fenestration unit of FIG. 1 with the movable sash in an open position (the movable sash as depicted in FIG. 1 is in its closed position).
Figure 4:
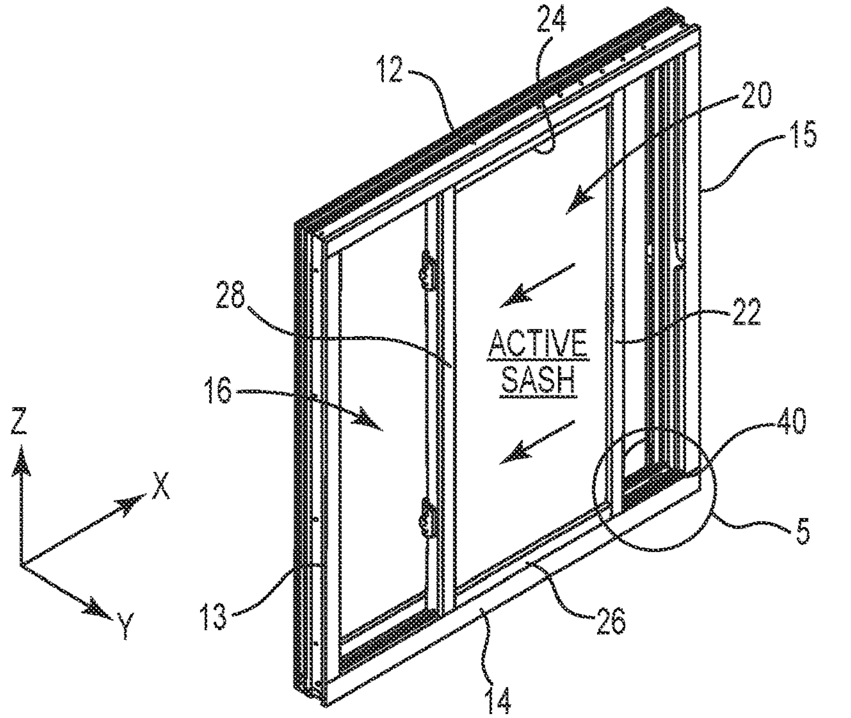
FIG. 4 is another perspective view of the fenestration unit of FIG. 1 with the movable sash and an open position.

In one or more embodiments of the fenestration units described herein, the movable sash may be movable within the fenestration frame between its open and closed positions such that in the open position, the movable sash provides an opening through which air passes unrestricted by a sash that occupies 30% or more, or 40% or more of the area within the fenestration frame components (e.g., the head jamb 12, sill 14, and side jambs 13 and 15 in the illustrative embodiment of fenestration unit 10 is depicted in FIGS. 1, 2, and 4) in the X-Z planes of the illustrative embodiments depicted in the figures.

Figure 3:
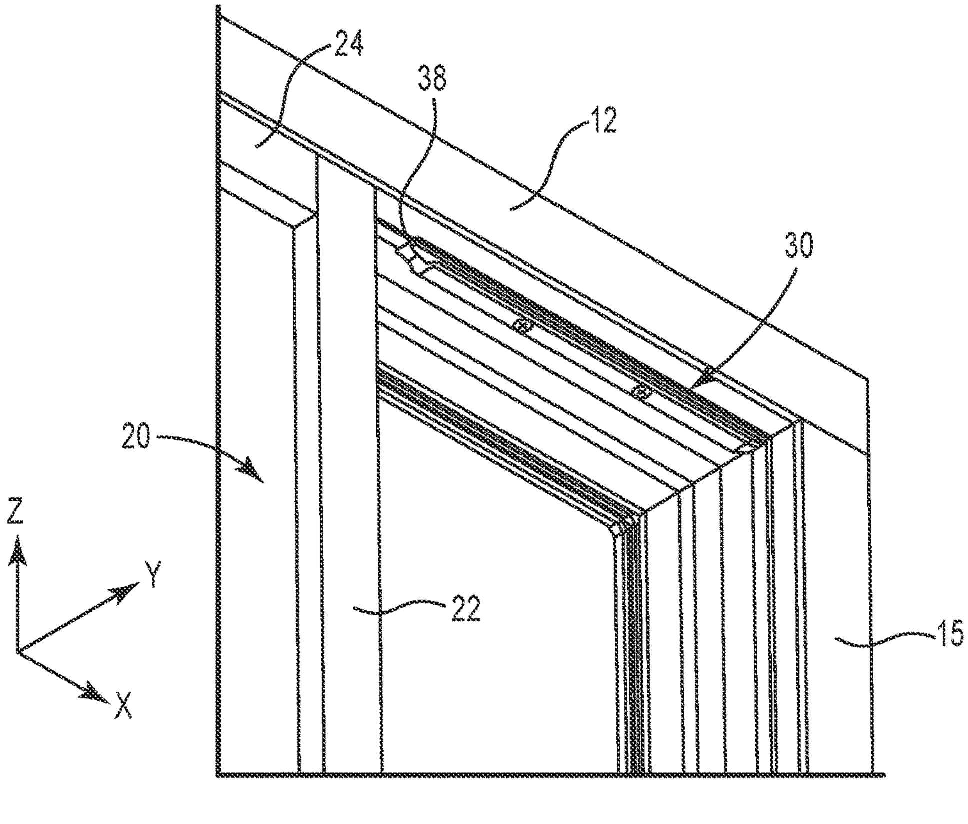
FIG. 3 is an enlarged perspective view of a portion of the illustrative embodiment of the fenestration unit depicted in FIG. 2.

The illustrative embodiment of fenestration unit 10 depicted in FIG. 2 includes a movable sash 20 at an intermediate position between its open and closed positions within the fenestration unit frame. FIG. 3 is an enlarged view of the junction between the head jamb 12 and side jamb 15 of the fenestration unit frame. Portions of leading stile 22 and head rail 24 of movable sash 20 are also seen in FIG. 3.

Also depicted in FIGS. 2-3 is one illustrative embodiment of a frame head component 30 attached to the head jamb 12 proximate the side jamb 15. The depicted frame head component 30 forms one part of a sash retention apparatus of a fenestration unit as described herein. In that position, the frame head component 30 is located between the head rail 24 and the head jamb 12 (as well as the leading stile 22) when the movable sash 20 is in the closed position (as seen in, e.g., FIG. 1).

The frame head component 30 includes a receiving end 38 positioned distal from the side jamb 15 such that the leading stile 22 and any components located thereon move past the receiving end 38 when the movable sash 20 is moving from an open position to the closed position. In one or more embodiments, the length of the frame head component may be such that the receiving end 38 of the frame head component 30 is located closer to the leading stile 22 of the movable sash 20 than the trailing stile 28 of the movable sash 20 when the movable sash 20 is in the closed position.

Figure 5:
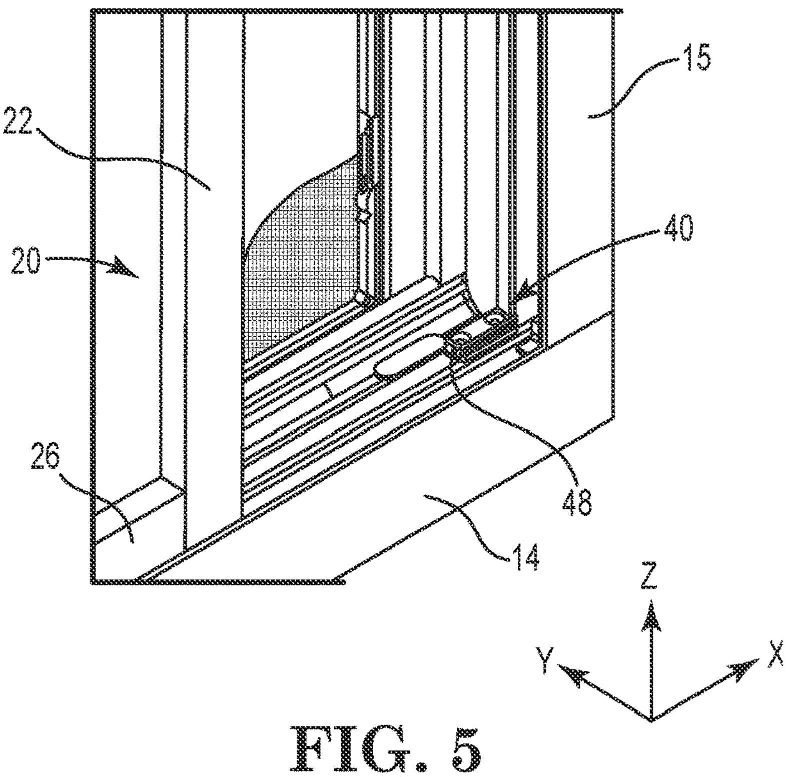
FIG. 5 is an enlarged perspective view of a portion of the illustrative embodiment of the fenestration unit as depicted in FIG. 4.

The illustrative embodiment of fenestration unit 10 depicted in FIG. 4 also includes a movable sash 20 at an intermediate position between its open and closed positions within the fenestration unit frame. FIG. 5 is an enlarged view of the junction between the and side jamb 15 of the fenestration unit frame. Portions of leading stile 22 and sill rail 26 are also depicted in FIG. 5.

Also depicted in FIGS. 4-5 is one illustrative embodiment of a frame sill component 40 attached to the sill proximate the side jamb 15. The depicted frame sill component 40 forms one part of a sash retention apparatus of a fenestration unit as described herein. In that position, the frame sill component 40 is located between the sill rail 26 and the sill 14 (as well as the leading stile 22) when the movable sash 20 is in the closed position (as seen in, e.g., FIG. 1).

The frame sill component 40 includes a receiving end 48 positioned distal from the side jamb 15 such that the leading stile 22 and any components located thereon move past the receiving end 48 when the movable sash 20 is moving from an open position to the closed position. In one or more embodiments of the fenestration units described herein, the receiving end 48 of the frame sill component 40 defines a first distance measured along the sill 14 (i.e., along the X-axis) from the receiving end 48 to the side jamb 15 that is smaller than a second distance measured along the head jamb 12 from the receiving end 38 of the frame head component 32 the side jamb 15 (also measured along the X-axis).

Figure 6:
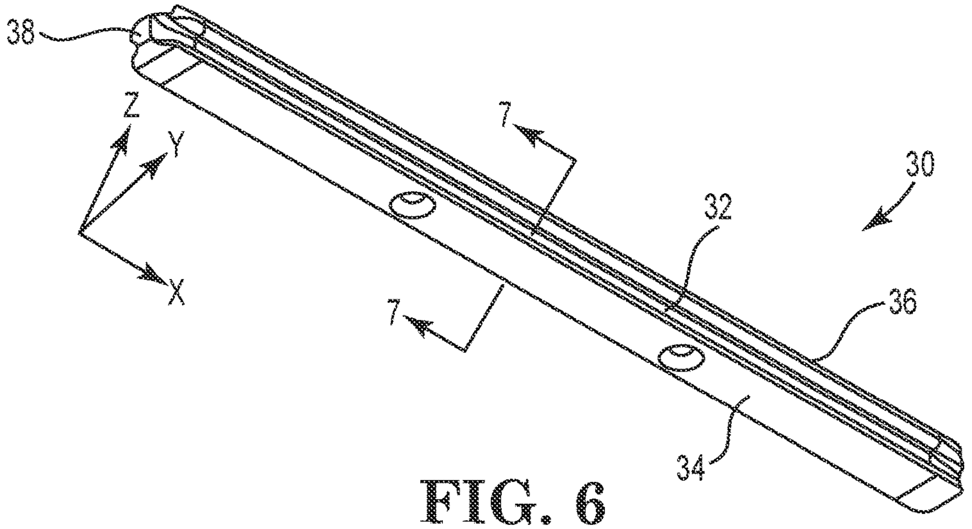
FIG. 6 is a perspective view of one illustrative embodiment of a frame head component as depicted in FIG. 3 removed from the fenestration unit.
Figure 7:
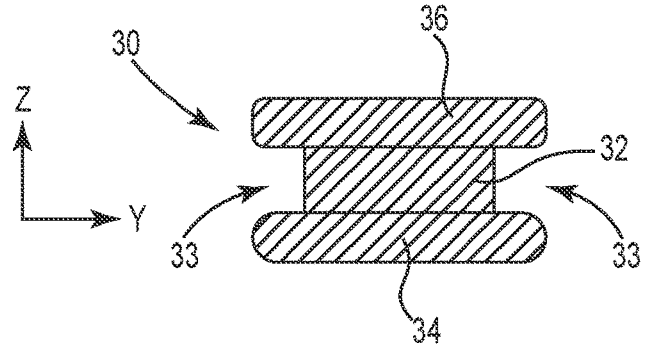
FIG. 7 is an enlarged cross-sectional view of the frame head component of FIG. 6 taken along line 7-7 in FIG. 6.

FIGS. 6 and 7 depict the illustrative embodiment of the frame head component 30 removed from the fenestration unit 10 with FIG. 7 being a cross-sectional view taken along line 7-7 in FIG. 6. The frame head component 30 has a generally I-beam profile as depicted in FIG. 6-7 including a web 32 position between flanges 34 and 36 such that a pair of channels 33 are formed on opposite sides of the web 32.

Figure 9:
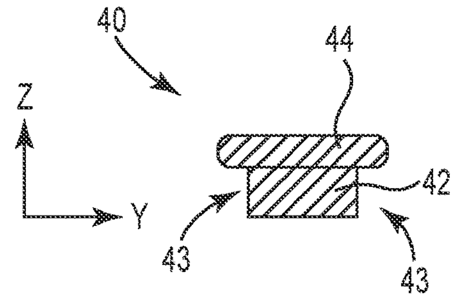
FIG. 9 is an enlarged cross-sectional view of the frame sill component of FIG. 8 taken along line 9-9 in FIG. 8.
Figure 8:
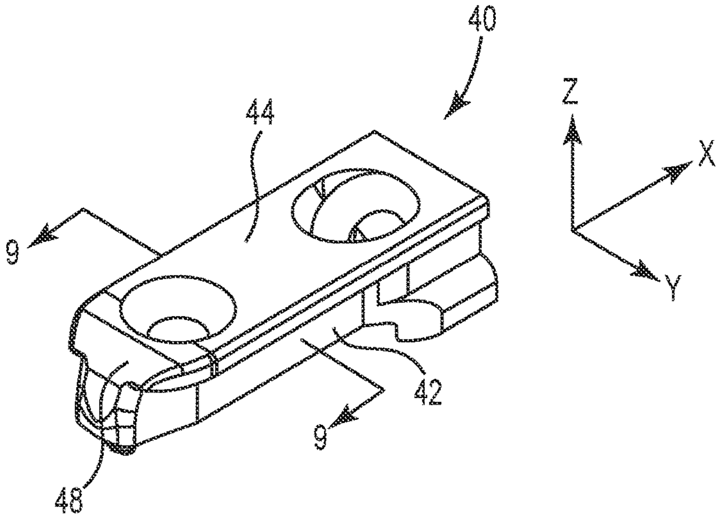
FIG. 8 is a perspective view of one illustrative embodiment of a frame sill component as depicted in FIG. 5 removed from the fenestration unit.

FIGS. 8 and 9 depict the illustrative embodiment of the frame sill component 40 removed from the fenestration unit 10 with FIG. 9 being a cross-sectional view taken along line 9-9 in FIG. 8. The frame sill component 40 includes a base 42 and a flange 44 with the base 42 being configured to abut the sill 12 such that the flange 44 is spaced apart from the sill 14. That spacing provides for a pair of channels 43 formed on opposite sides of the base 42 when the frame sill component 40 is attached to a sill as described herein and depicted in FIGS. 4-5.

Figure 10:
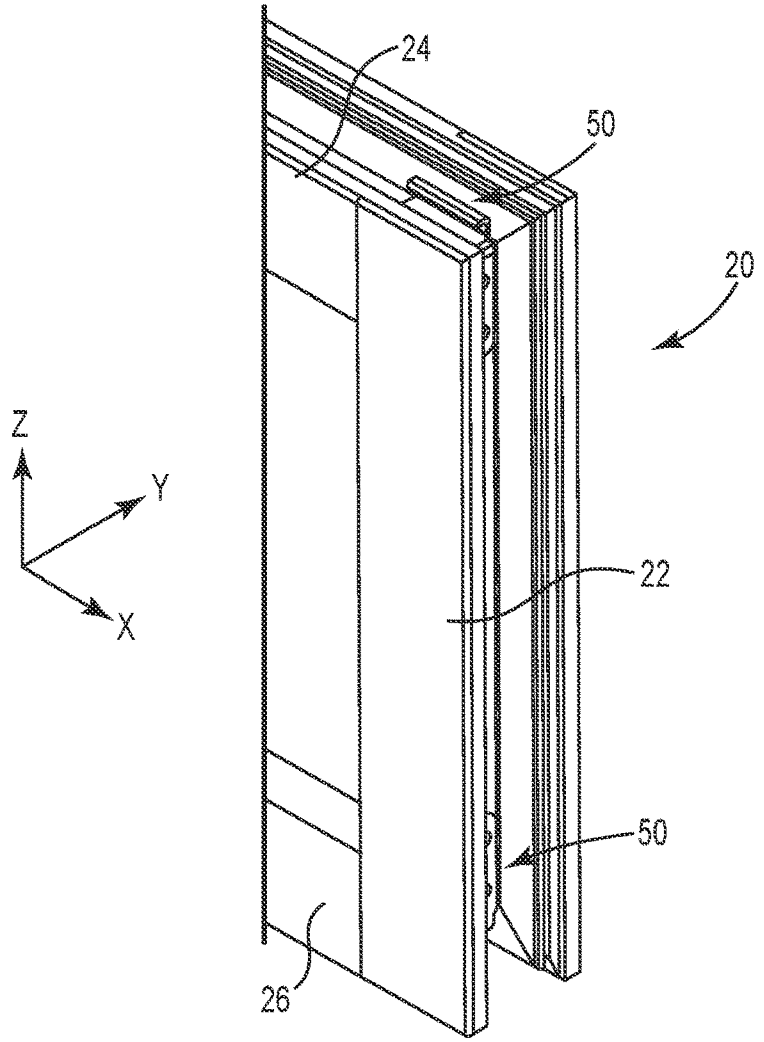
FIG. 10 is a perspective view of another illustrative embodiment of a movable sash that may be used in one or more embodiments of a fenestration unit as described herein, the view being taken including the leading stile and portions of the head and sill rails.

FIG. 10 is a perspective view of a portion of the movable sash 20 including the leading stile 22 along with portions of the head rail 24 and the sill rail 26. Also depicted in FIG. 10 are components of one illustrative embodiment of a sash retention apparatus as described herein. In particular, a sash head component 50 of the illustrative embodiment of a sash retention apparatus is attached to the sash frame at the junction between the leading stile 22 and the head rail 24 while a sash sill component 50 of the illustrative embodiment of a sash retention apparatus is attached to the sash frame at the junction between the leading stile 22 and the sill rail 26. Although the sash head component and the sash sill component are identical in the depicted illustrative embodiment, it should be understood that one or more alternative embodiments of sash retention apparatus of fenestration units as described herein may include sash head components and sash sill components that differ.

Figure 11:
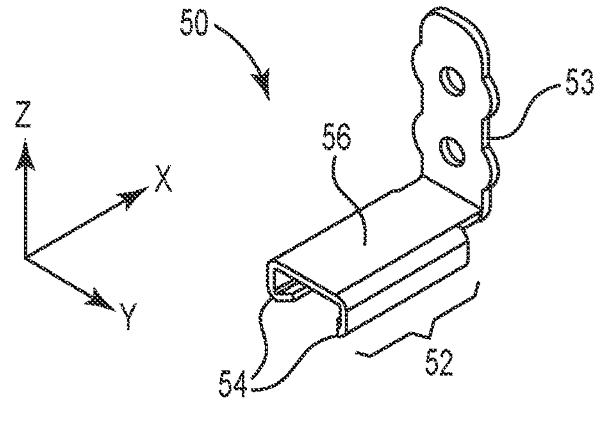
FIGS. 11-12 are enlarged perspective views of one illustrative embodiment of a sash component of a sash retention apparatus as described herein.
Figure 12:
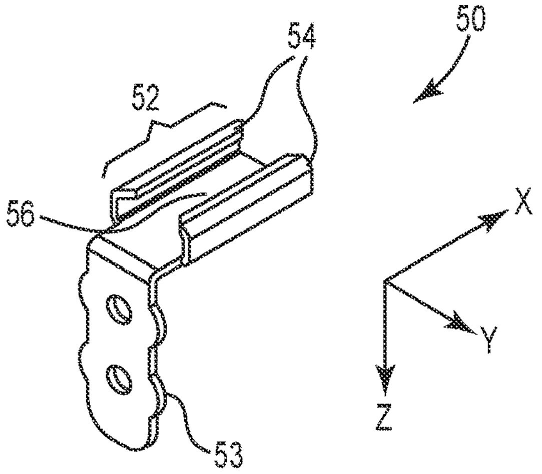

The sash head/sill component 50 is depicted separately in FIGS. 11-12. The depicted illustrative embodiments of the sash head/sill component 50 includes a fastener flange 53 configured for attachment to the leading stile 22 of the movable sash 20. The fastener flange 53 is attached to a base 52. The base 52 of the sash head/sill component 50 includes a body 56 from which a pair of arms 54 extend. The arms 54 and body 56 are configured to form a mechanical interlock with the frame head component 30 or the frame sill component 40 when the movable sash 20 is in a closed position as described herein. In essence, the sash head/sill component 50 provides a structure that is complementary to the structure of the frame head component 30 and the frame sill component 40 such that a mechanical interlock can be formed between the sash head/sill component 50 and each of the frame head component 30 and the frame sill component 40.

Figure 13:
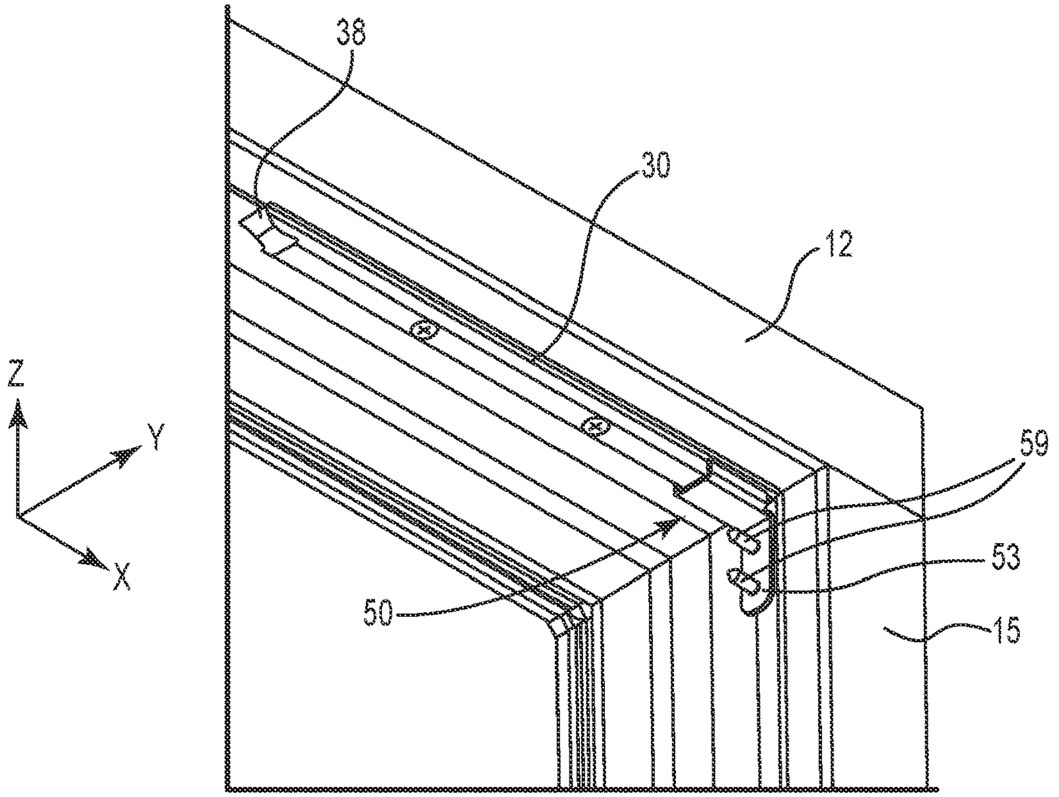
FIG. 13 is an enlarged perspective view of the fenestration unit as depicted in FIG. 3 with a sash head component engaged with the frame head component (the sash is not depicted in FIG. 13 to expose the sash head component) as described herein.

FIG. 13 is an enlarged perspective view of the junction between the head jamb 12 and side jamb 15 including frame head component 30 attached to head jamb 12. Also depicted in FIG. 13 is one embodiment of the sash head component 50 engaged with the frame head component 30. The movable sash 20 is removed from FIG. 13 so that the movable sash 20 does not obscure the view of the sash head component 50 as engaged with the frame head component 30. Also depicted in FIG. 13 are fasteners 59 extending through fastener flange 53 of sash head component 50 to secure the sash head component 50 to the leading stile 22 of the movable sash 20. Any other suitable components or techniques capable of attaching the sash head component 50 to the leading stile 22 could be used in place of the depicted threaded fasteners.

Figure 14:
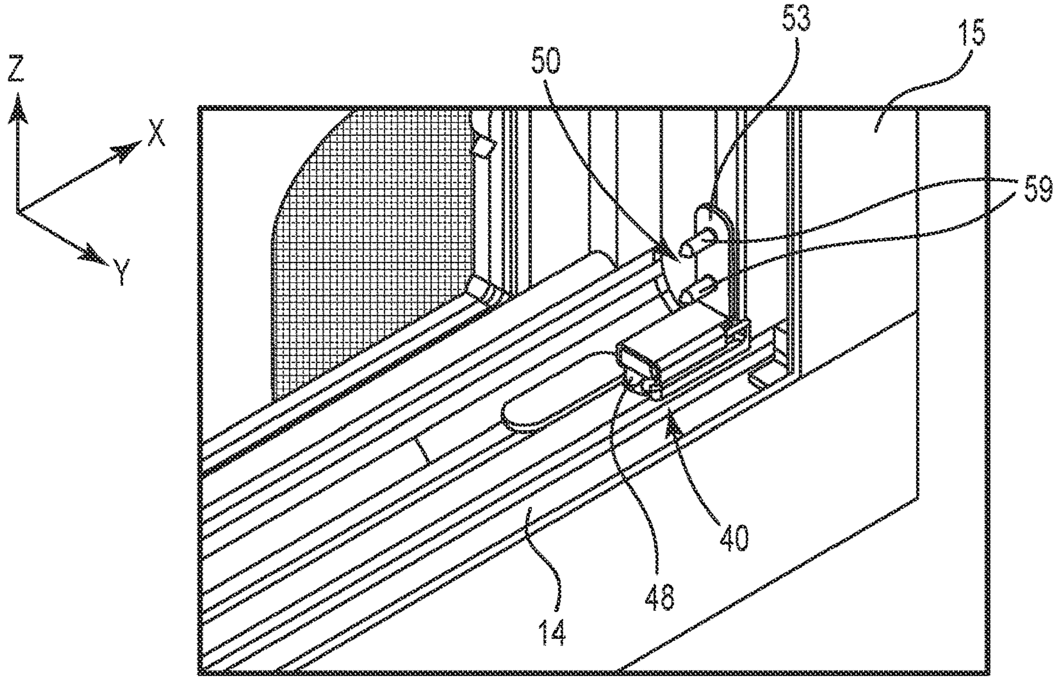
FIG. 14 is in an enlarged perspective view of the fenestration unit as depicted in FIG. 5 with a sash sill component engaged with the frame sill component (the sash is not depicted in FIG. 14 to expose the sash sill component) as described herein.

FIG. 14 is an enlarged perspective view of the junction between the sill 14 and the side jamb 15 including frame sill component 40 attached to sill 14. Also depicted in FIG. 14 is one embodiment of the sash sill component 50 engaged with the frame sill component 40. The movable sash 20 is removed from FIG. 14 so that the movable sash 20 does not obscure the view of the sash sill component 50 as engaged with the frame sill component 40. Also depicted in FIG. 14 are fasteners 59 that can be used in one or more embodiments of the sash sill component 50 to secure the sash sill component 50 to the leading stile 22 of the movable sash 20. As above, any other suitable components or techniques capable of attaching the sash sill component 50 to the leading stile 22 could be used in place of the depicted threaded fasteners.

In one or more embodiments, it may be preferred that the sash head/sill components 50 be attached directly to the leading stile 22 (using, for example, a fastener flange 53) such that when the sash head/sill components 50 form mechanical interlocks with the frame head component 30 and the frame sill component 40, the ends of the leading stile 22 are firmly secured to the head jamb 12 and the sill 14 to maintain integrity of the sash frame of the movable sash 20 after the rigidity/structural integrity of glass lite 21 has been compromised as described herein.

Figure 15:
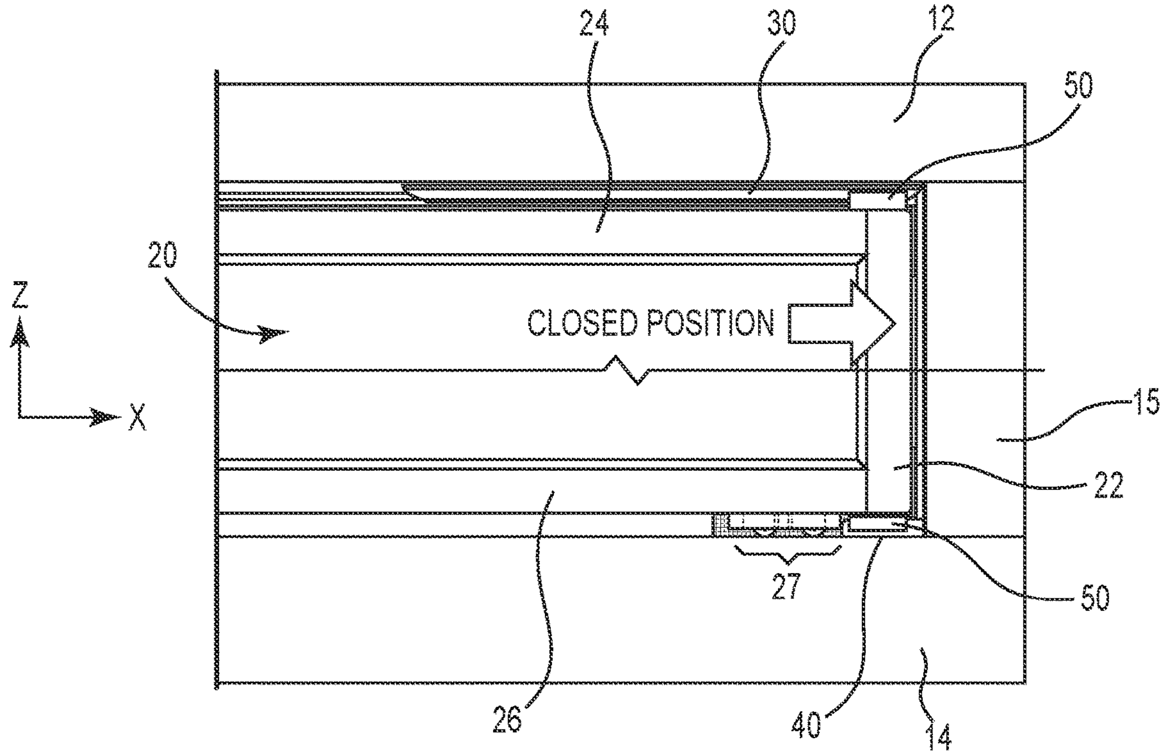
FIG. 15 depicts one illustrative embodiment of a movable sash in a closed position within a fenestration unit frame with portions of the leading stile, head rail, and sill rail removed to expose components of one illustrative embodiment of a sash retention apparatus as described herein.
Figure 16:
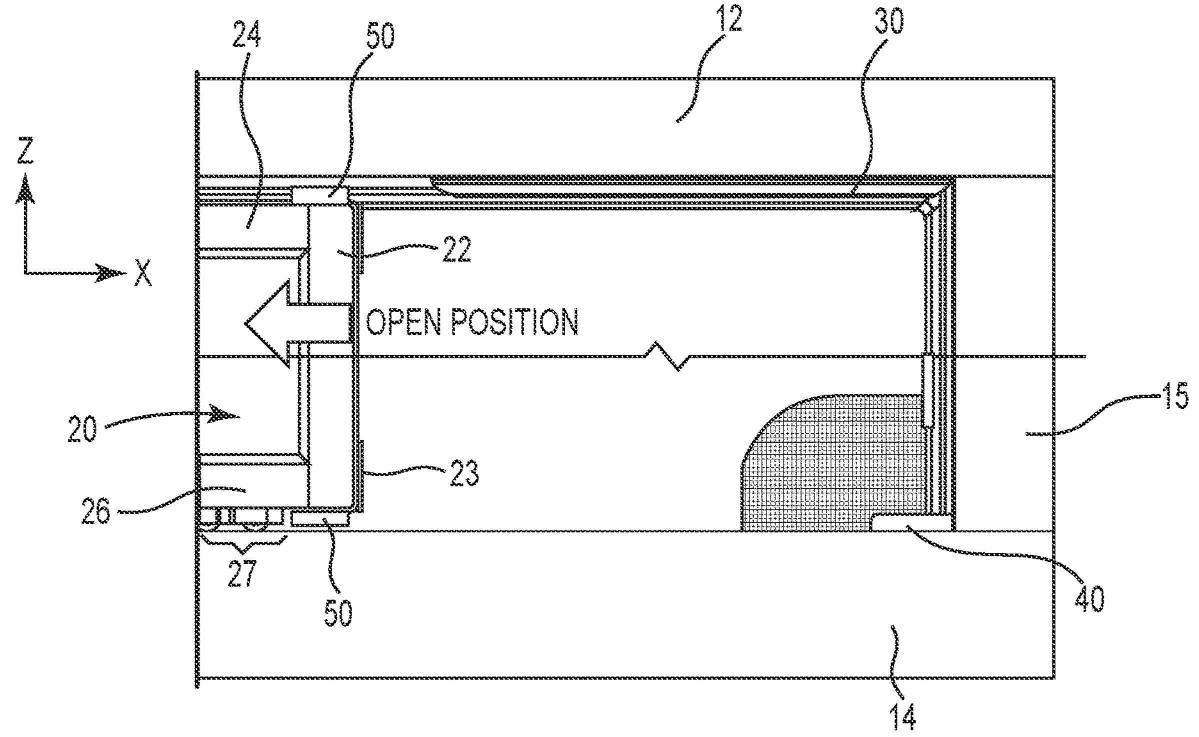
FIG. 16 depicts the movable sash and fenestration unit frame as well as sash retention apparatus components of FIG. 15 with the movable sash in an open position within the fenestration unit frame.

FIG. 15 depicts the illustrative embodiment of movable sash 20 (with the Z-dimension reduced to depict both the head and sash components) in a closed position within a fenestration unit frame. Portions of the leading stile 22, had rail 24, and sill rail 26 have been removed to expose components of the illustrative embodiment of a sash retention apparatus as described herein. FIG. 16 depicts the movable sash 20 and fenestration unit frame as well as sash retention apparatus components of FIG. 15 with the movable sash 20 in an open position within the fenestration unit frame.

As depicted in FIG. 15, when the movable sash 20 is in the closed position the frame head component 30 is located between both the leading stile 22 and a portion of the head rail 24 of the movable sash 20. Also depicted is a sash head component 50 engaged with the frame head component 30, the depicted illustrative embodiment of sash head component 50 being located between the leading stile 22 of the movable sash 20 and a portion of the head rail 24 of movable sash 20.

As also depicted in FIG. 15, when the movable sash 20 is in the closed position the frame sill component 40 is located between both the leading stile 22 and a portion of the sill rail 26 of the movable sash 20. A sash sill component 50 is engaged with the frame sill component 40, with the depicted illustrative embodiment of sash sill component 50 being located between the leading stile 22 of the movable sash 20 and a portion of the sill rail 24 of the movable sash 20.

The illustrative embodiment of movable sash 20 as depicted in FIGS. 15-16 includes at least one roller assembly 27 supporting at least a portion of the sill rail 26 of the movable sash 20 above the sill 20. In the depicted illustrative embodiment, the sash sill component 40 is located between the roller assembly 27 and a side jamb 15 of the fenestration unit frame. The length of the sash sill component 40 as measured along the sill 14 (i.e., along the X-axis) is preferably selected to avoid interference with a roller assembly 27 located closest to the leading stile 22 of a movable sash of a fenestration unit as described herein when the movable sash is in its closed position as depicted in FIG. 15.

With reference to FIGS. 15-16, movement of the movable sash 20 to the open position results in disengagement of the sash head component 50 from the frame head component 30 as well as disengagement of the sash sill component 50 from the frame sill component 40. With the sash retention apparatus components disengaged, the movable sash 20 can be manipulated to allow for removal of the movable sash 20 from the fenestration unit frame 4 cleaning, replacement, etc. as needed.

Due to the different lengths (as measured along the X-axis) of the frame head component 30 and the frame sill component 40, it can be seen that the sash sill component 50 disengages from the frame sill component 40 before the sash head component 50 disengages from the frame head component 30 as the movable sash 20 is moved from its closed position as depicted in FIG. 15 to an open position as depicted in FIG. 16.

Figure 17:
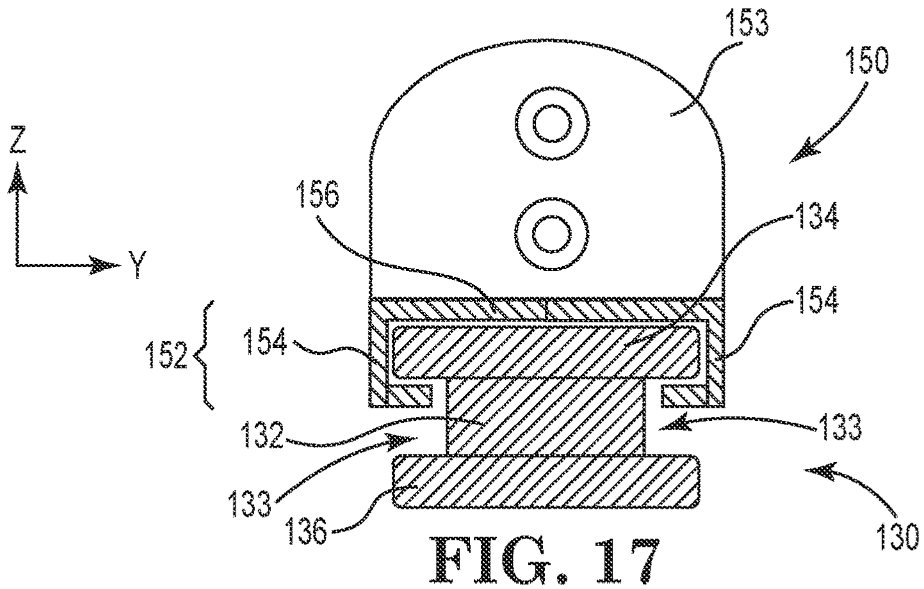
FIGS. 17-19 are partial cross-sectional views of some alternative illustrative embodiments of sash and frame components that may be used in one or more embodiments of a sash retention apparatus as described herein.
Figure 18:
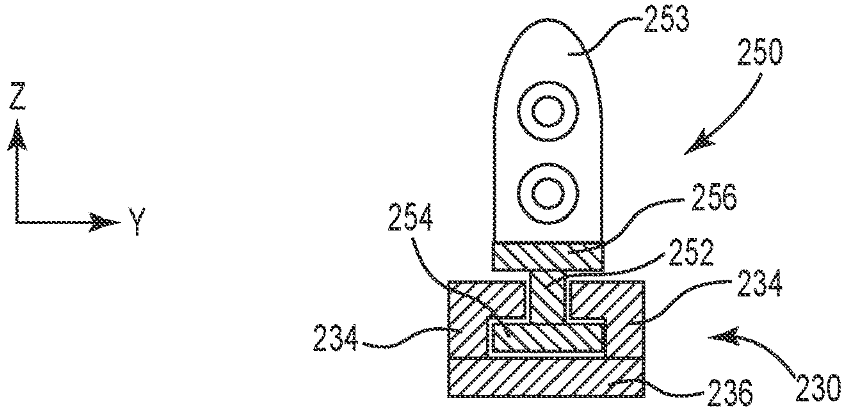
Figure 19:
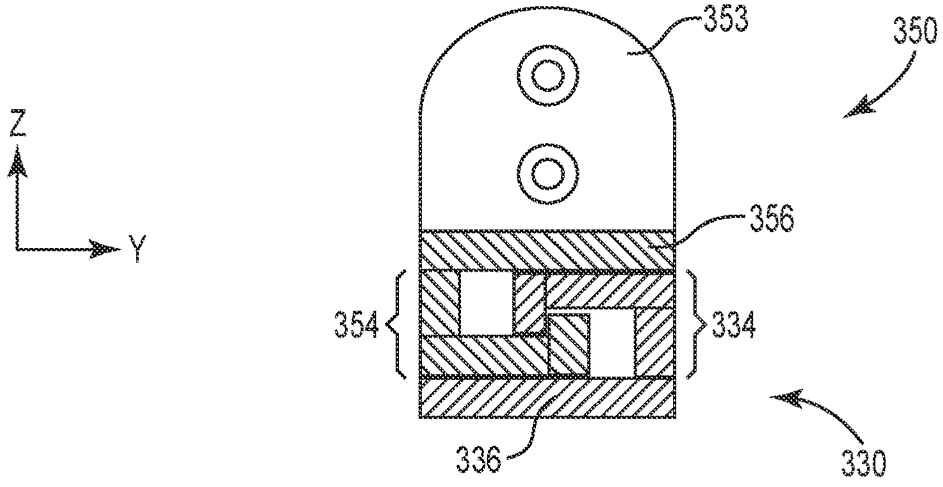

Some illustrative embodiments of frame head/sill components and complementary sash head/sill components are depicted in FIGS. 17-19. In all embodiments, the frame head/sill components engage with the complementary sash head/sill components to form a mechanical interlock between the frame head/sill components and the sash head/sill components such that the sash head/sill components are restricted from moving away from the frame head/sill components as described herein.

In particular, the mechanical interlock formed between a frame head component and a sash head component as described herein restricts movement of the sash head component and the leading end of a head rail of a sash to which the sash head component is attached are restricted such that the sash head component and the leading end of the head rail are restricted from moving away from the frame head component engaged with the sash head component and the head jamb towards the sill. In terms of the Cartesian coordinate systems depicted in the figures, that restricted movement would be in the Z axis direction.

Similarly, the mechanical interlock formed between a frame sill component and a sash sill component as described herein restricts movement of the sash sill component and the leading end of a sill rail of a sash to which the sash sill component is attached are restricted such that the sash sill component and the leading end of the sill rail are restricted from moving away from the frame sill component engaged with the sash sill component and the sill towards the head jam. In terms of the Cartesian coordinate systems depicted in the figures, that restricted movement would also be in the Z axis direction.

In one or more embodiments of fenestration units as described herein the mechanical interlock formed between a frame head component and a sash head component as described herein may also restrict movement of the sash head component and the leading end of the head rail of the sash to which the sash head component is attached such that the sash head component and the leading end of the head rail are restricted from moving out of a plane defined by the fenestration unit frame. In terms of the Cartesian coordinate systems depicted in the figures, that restricted movement would be in the Y axis direction.

In one or more embodiments of the fenestration units as described herein the mechanical interlock formed between a frame sill component and a sash sill component as described herein may also restrict movement of the sash sill component and the leading end of the sill rail of the sash to which the sash sill component is attached such that the sash sill component and the leading end of the sill rail are restricted from moving out of a plane defined by the fenestration unit frame. In terms of the Cartesian coordinate systems depicted in the figures, that restricted movement would be in the Y axis direction.

The embodiment of a frame head component 130 and complementary sash head component 150 depicted in FIG. 17 are similar to frame head component 30 and complementary sash head component 50 depicted in FIGS. 2-3, 6-7, and 13. The frame head component 130 has a generally I-beam profile including a web 132 positioned between flanges 134 and 136 such that a pair of channels 133 are formed on opposite sides of the web 132.

The sash head component 150 includes a fastener flange 153 configured for attachment to the leading stile of a movable sash. The fastener flange is attached to a base 152. The base 152 of the sash head component 150 includes a body 156 from which a pair of arms 154 extend. The arms 154 and body 156 are configured to form a mechanical interlock with the frame head component 130 when a movable sash is in a closed position as described herein. As depicted, arms 154 and body 156 define a channel that receives and retains web 134 of frame head component 130 to restrict movement of the frame head component 130 and sash head component 150 relative to each other in both the Z axis as well as the Y axis directions.

The embodiment of the frame head component 230 and complementary sash head component 250 depicted in FIG. 18 provide a mechanical interlock that also restricts movement of the frame head component 230 and sash head component 250 relative to each other in both the Z axis as well as the Y axis directions. In the depicted embodiment, however, the frame head component 230 includes a pair of arms 234 that along with a body 236 form a channel that receives a flange 254 of sash head component 250. Flange 254 is attached to a base flange 256 through a web 252 with the base flange 256 being attached to a fastener flange 253 to form sash head component 250.

The embodiment of the frame head component 330 and complementary sash head component 350 depicted in FIG. 19 also provide a mechanical interlock that restricts movement of the frame head component 330 and the sash head component 350 relative to each other in both the Z axis as well as the Y axis directions. In the depicted illustrative embodiment, the frame head component 330 includes a single arm 334 attached to a base 336 while sash head component 350 also includes a single arm 354 attach to a base 356 that is, in turn, attached to a fastener flange 353. The arms 334 and 354 of the frame head component 330 and sash head component 350 form a mechanical interlock as depicted in FIG. 19 that restricts movement as also described herein.

Figure 20:
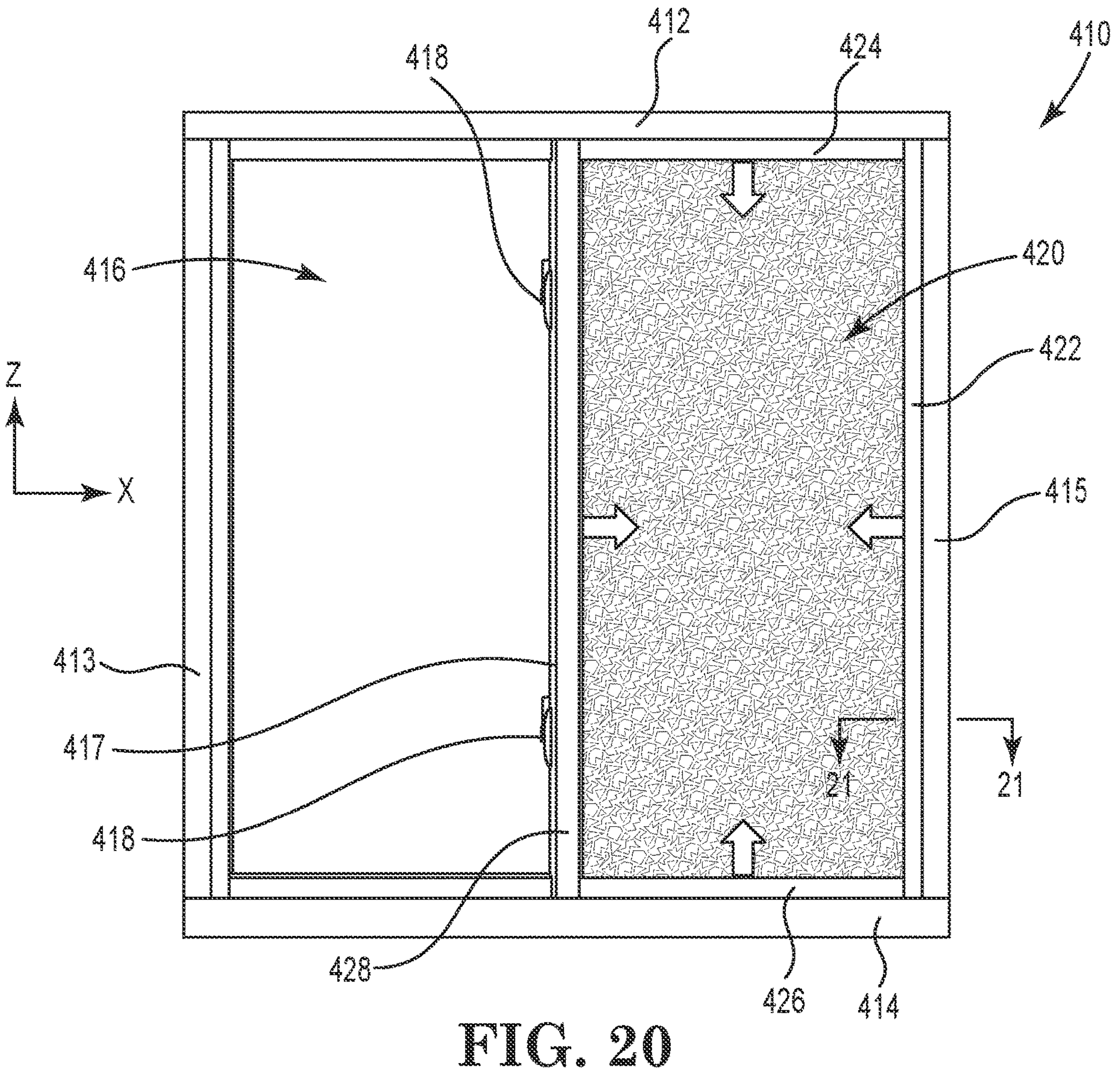
FIG. 20 depicts another illustrative embodiment of a fenestration unit as described herein with the glass lite of the movable panel compromised (e.g., broken and/or shattered but not punctured or torn).

One alternative illustrative embodiment of a fenestration unit as described herein with the glass lite of the movable panel compromised (e.g., broken and/or shattered but not punctured or torn) is depicted in FIG. 20. The fenestration unit 410 includes a fenestration unit frame including a head jamb 412, sill 414, and side jambs 413 and 415. The movable sash 420 located within the fenestration unit frame includes a leading stile 422, trailing stile 428, head rail 424 and sill rail 426. A stationary sash 416 is also located in the fenestration unit frame with a pair of sash locks 418 being used to secure the trailing stile 428 of movable sash 420 to locking stile 417 of stationary sash 416.

As discussed herein, when the glass lite 421 of the movable panel 420 is compromised due to, e.g., an impact event such that the glass lite 421 no longer provides rigidity or structural stiffness to the movable sash 420, the panels of the glass lite itself, stiles 422 and 428 as well as rails 424 and 426 may deform enough to allow the movable sash 422 escape from the fenestration unit frame in response to forces applied to the movable sash 420 by, e.g., wind, etc. For example, the central portions of the leading stile 422 and trailing stile 428 may move towards each other while the central portions of the head rail 424 and sill rail 426 may also move towards each other as the glass lite 421 deforms or flexes. Escape of the movable sash from the fenestration unit frame is clearly undesirable.

Because the trailing stile 428 is secured to the locking stile 417 of stationary sash 416 by sash locks 418, the trailing stile 428 is at least partially reinforced or restrained by the locking stile 417. The leading stile 422, however, has no such reinforcement. By providing mechanical interlocks between the movable sash 420 and the fenestration unit frame at opposite ends of the leading stile 422, sufficient reinforcement or restraint of the leading stile 422 can be provided to substantially reduce the likelihood of escape of the movable sash 420 from the fenestration unit frame.

Figure 21:
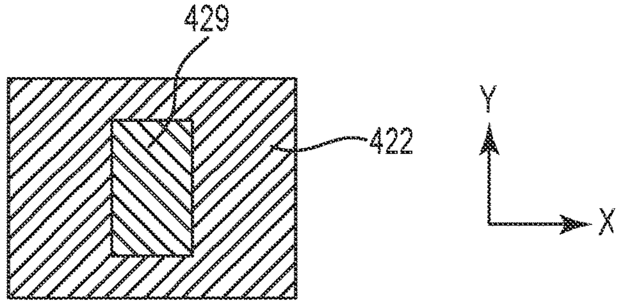
FIG. 21 is a schematic diagram of one illustrative embodiment of a stiffener located within a leading stile of a movable sash of one illustrative embodiment of a fenestration unit as described herein.

In one or more embodiments of the fenestration units described herein the leading stile of a movable sash, for example, leading stile 422 of movable sash 420, may be reinforced to provide additional stiffness to the leading stile. FIG. 21 is a cross-sectional view of the leading stile 422 of movable sash 420 taken along line 21-21 in FIG. 20.

As depicted in FIG. 21, the leading stile 422 may include a stiffener element 429 configured to increase the resistance of the leading stile 422 to deformation in a direction out of the sash plane defined by the sash frame. With reference to the Cartesian coordinate system depicted in FIGS. 20-21, that stiffener element 429 may increase resistance of the leading stile 422 to deformation in one or both of the X axis and Y axis directions. That increased resistance to deformation of the leading stile may be, for example, compared to a resistance of the trailing stile 428 of a movable sash 422 deformation in a direction out of the sash plane defined by the sash frame.

Although not required, in one or more embodiments, the stiffener element 429 may be, as depicted in FIG. 21, located within an interior volume of the leading stile 422. Placing the stiffener element 429 within the leading stile 422 may improve the aesthetic appearance of the movable sash as well as prevent mechanical interference between the stiffener element 429 and other components of the fenestration unit. The various components used in the sash retention apparatus, i.e., the frame head components, frame sill components, sash head components, and sash sill components, etc. may be constructed of any suitable material or combination of materials including polymers, metals, composites, wood, ceramics, etc. The particular materials used need only perform the functions of the various components as described herein and suitable choices for the materials will be known to those of skill in the art.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of fenestration units including sash retention apparatus and related methods are discussed herein with some possible variations described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

The invention claimed is:

1. A fenestration unit comprising:

a fenestration unit frame comprising a first side jamb and a second side jamb, wherein the first side jamb is connected to a first end of each of a head jamb and a sill, and wherein the second side jamb is connected to a second end of each of the head jamb and the sill;

a movable sash retained in the fenestration unit frame, wherein the movable sash comprises a sash frame comprising a leading stile and a trailing stile, wherein the leading stile extends between a leading end of a head rail and a leading end of a sill rail and the trailing stile extends between a trailing end of a head rail and a trailing end of a sill rail, and wherein the movable sash is positioned in the fenestration unit frame and configured to move within the fenestration unit frame between the first side jamb and the second side jamb, wherein the movable sash is in a closed position in the fenestration unit frame when the leading stile is adjacent the first side jamb, and wherein the movable sash is in an open position in the fenestration unit frame when the leading stile is spaced apart from the first side jamb; and a sash retention apparatus comprising:

a frame head component attached to the head jamb proximate the first side jamb such that the frame head component is located between the head rail and the head jamb when the movable sash is in the closed position, a sash head component attached to the sash frame, the sash head component located between the head rail and the head jamb proximate the leading end of the head rail, wherein, when the movable sash is in the closed position, the frame head component engages with the sash head component to form a first mechanical interlock between the frame head component and the sash head component such that the sash head component and the leading end of the head rail are restricted from moving away from the frame head component and the head jamb towards the sill, a frame sill component attached to the sill proximate the first side jamb such that the frame sill component is located between the sill rail and the sill proximate the first end of the head jamb when the movable sash is in the closed position, a sash sill component attached to the sash frame, the sash sill component located between the sill rail and the sill proximate the leading end of the sill, wherein, when the movable sash is in the closed position, the sash sill component engages with the frame sill component to form a second mechanical interlock between the sash sill component and the frame sill component such that the sash sill component and the leading end of the sill rail are restricted from moving away from the frame sill component and the sill towards the head jamb.

2. The fenestration unit according to claim 1, wherein the second mechanical interlock between the frame sill component and the sash sill component when the movable sash is in the closed position restricts movement of the leading end of the sill rail out of a plane defined by the fenestration unit frame.

3. The fenestration unit according to claim 1, wherein the first mechanical interlock between the frame head component and the sash head component when the movable sash is in the closed position restricts movement of the leading end of the head rail out of a plane defined by the fenestration unit frame.

4. The fenestration unit according to claim 1, wherein the second mechanical interlock between the frame sill component and the sash sill component when the movable sash is in the closed position restricts movement of the leading end of the sill rail out of a plane defined by the fenestration unit frame; and wherein the first mechanical interlock between the frame head component and the sash head component when the movable sash is in the closed position restricts movement of the leading end of the head rail out of a plane defined by the fenestration unit frame.

5. The fenestration unit according to claim 1, wherein the sash sill component disengages from the frame sill component when the movable sash moves from the closed position to the open position.

6. The fenestration unit according to claim 1, wherein the sash head component disengages from the frame head component when the movable sash moves from the closed position to the open position.

7. The fenestration unit according to claim 1, wherein the sash sill component disengages from the frame sill component and the sash head component disengages from the frame head component when the movable sash moves from the closed position to the open position.

8. The fenestration unit according to claim 7, wherein the sash sill component disengages from the frame sill component before the sash head component disengages from the frame head component when the movable sash moves from the closed position to the open position.

9. The fenestration unit according to claim 1, wherein the movable sash comprises a roller assembly supporting at least a portion of the sill rail of the movable sash above the sill, wherein the sash sill component is located between the roller assembly and the first side jamb.

10. The fenestration unit according to claim 9, wherein the roller assembly is located closer to the leading stile than the trailing stile.

11. The fenestration unit according to claim 1, wherein the frame head component comprises a receiving end positioned distal from the first side jamb, wherein the sash head component moves past the receiving end when the movable sash is moving from the open position to the closed position, and wherein, when the movable sash is in the closed position, the receiving end is located closer to the leading stile of the movable sash than the trailing stile of the movable sash.

12. The fenestration unit according to claim 11, wherein the frame sill component comprises a receiving end positioned distal from the first side jamb, wherein the sash sill component moves past the receiving end of the frame sill component when the movable sash is moving from the open position to the closed position, and wherein a first distance measured along the sill from the receiving end of the frame sill component to the first side jamb is smaller than a second distance measured along the head jamb from the receiving end of the frame head component to the first side jamb.

13. The fenestration unit according to claim 1, wherein the leading stile of the movable sash comprises a stiffener element configured to increase a resistance of the leading stile to deformation in a direction out of a sash plane defined by the sash frame as compared to a resistance of the trailing stile to deformation in a direction out of the sash plane defined by the sash frame.

14. The fenestration unit according to claim 13, wherein the stiffener element is located in an interior volume of the leading stile.

15. A fenestration unit comprising:

a fenestration unit frame comprising a first side jamb and a second side jamb, wherein the first side jamb is connected to a first end of each of a head jamb and a sill, and wherein the second side jamb is connected to a second end of each of the head jamb and the sill;

a movable sash retained in the fenestration unit frame, wherein the movable sash comprises a sash frame comprising a leading stile and a trailing stile, wherein the leading stile extends between a leading end of a head rail and a leading end of a sill rail and the trailing stile extends between a trailing end of a head rail and a trailing end of a sill rail, and wherein the movable sash is positioned in the fenestration unit frame and configured to move within the fenestration unit frame between the first side jamb and the second side jamb, wherein the movable sash is in a closed position in the fenestration unit frame when the leading stile is adjacent the first side jamb, and wherein the movable sash is in an open position in the fenestration unit frame when the leading stile is spaced apart from the first side jamb; and a sash retention apparatus comprising:

a frame head component attached to the head jamb proximate the first side jamb such that the frame head component is located between the head rail and the head jamb when the movable sash is in the closed position, a sash head component attached to the sash frame, the sash head component located between the head rail and the head jamb proximate the leading end of the head rail, wherein, when the movable sash is in the closed position, the frame head component engages with the sash head component to form a first mechanical interlock between the frame head component and the sash head component such that the sash head component and the leading end of the head rail are restricted from moving away from the frame head component and the head jamb towards the sill, and wherein the first mechanical interlock between the frame head component and the sash head component restricts movement of the leading end of the head rail out of a plane defined by the fenestration unit frame, a frame sill component attached to the sill proximate the first side jamb such that the frame sill component is located between the sill rail and the sill proximate the first end of the head jamb when the movable sash is in the closed position, a sash sill component attached to the sash frame, the sash sill component located between the sill rail and the sill proximate the leading end of the sill, wherein, when the movable sash is in the closed position, the sash sill component engages with the frame sill component to form a second mechanical interlock between the sash sill component and the frame sill component such that the sash sill component and the leading end of the sill rail are restricted from moving away from the frame sill component and the sill towards the head jamb, and wherein the second mechanical interlock between the frame sill component and the sash sill component restricts movement of the leading end of the sill rail out of a plane defined by the fenestration unit frame;

wherein the sash sill component disengages from the frame sill component when the movable sash moves from the closed position to the open position;

wherein the sash head component disengages from the frame head component when the movable sash moves from the closed position to the open position; and wherein the sash sill component disengages from the frame sill component before the sash head component disengages from the frame head component when the movable sash moves from the closed position to the open position.

16. The fenestration unit according claim 15, wherein the movable sash comprises a roller assembly supporting at least a portion of the sill rail of the movable sash above the sill, wherein the sash sill component is located between the roller assembly and the first side jamb.

17. The fenestration unit according to claim 16, wherein the roller assembly is located closer to the leading stile than the trailing stile.

18. The fenestration unit according to claim 15, wherein the frame head component comprises a receiving end positioned distal from the first side jamb, wherein the sash head component moves past the receiving end when the movable sash is moving from the open position to the closed position, and wherein, when the movable sash is in the 31 closed position, the receiving end is located closer to the leading stile of the movable sash than the trailing stile of the movable sash.

19. The fenestration unit according to claim 18, wherein the frame sill component comprises a receiving end positioned distal from the first side jamb, wherein the sash sill component moves past the receiving end of the frame sill component when the movable sash is moving from the open position to the closed position, and wherein a first distance measured along the sill from the receiving end of the frame sill component to the first side jamb is smaller than a second distance measured along the head jamb from the receiving end of the frame head component to the first side jamb.

20. The fenestration unit according to claim 15, wherein the leading stile of the movable sash comprises a stiffener element configured to increase a resistance of the leading stile to deformation in a direction out of a sash plane defined by the sash frame as compared to a resistance of the trailing stile to deformation in a direction out of the sash plane defined by the sash frame.

21. The fenestration unit according to claim 20, wherein the stiffener element is located in an interior volume of the leading stile.

22. A method of retaining a sash in the fenestration unit of claim 1, the method comprising:

forming a first mechanical interlock between a leading end of head rail of a sash frame of a movable sash and a head jamb of a fenestration unit frame in which the sash is retained when moving the movable sash into a closed position in which a leading stile of the sash frame of the movable sash is adjacent a first side jamb of the fenestration unit frame, wherein the first mechanical interlock restricts a leading end of the head rail located proximate the leading stile from moving away from the head jamb and towards a sill of the fenestration unit frame, and wherein the first mechanical interlock disengages when moving the movable sash from the closed position to an open position in which the leading stile is spaced apart from the first side jamb; and forming a second mechanical interlock between the leading end of a sill rail of the sash frame of the movable sash and the sill of the fenestration unit frame when moving the movable sash into the closed position, wherein the second mechanical interlock restricts a leading end of the sill rail proximate the leading stile of the sash frame from moving away from the sill and towards the head jamb, and wherein the second mechanical interlock disengages when moving the movable sash from the closed position to the open position.

23. The method according to claim 22, wherein the first mechanical interlock engages before the second mechanical interlock when moving the movable sash from the open position to the closed position and wherein the second mechanical interlock disengages before the first mechanical interlock disengages when moving the movable sash from the closed position to the open position.

24. A method of retaining a sash in the fenestration unit of claim 15, the method comprising:

forming a first mechanical interlock between a leading end of head rail of a sash frame of a movable sash and a head jamb of a fenestration unit frame in which the sash is retained when moving the movable sash into a closed position in which a leading stile of the sash frame of the movable sash is adjacent a first side jamb of the fenestration unit frame, wherein the first mechanical interlock restricts a leading end of the head rail located proximate the leading stile from moving away from the head jamb and towards a sill of the fenestration unit frame, and wherein the first mechanical interlock disengages when moving the movable sash from the closed position to an open position in which the leading stile is spaced apart from the first side jamb; and forming a second mechanical interlock between the leading end of a sill rail of the sash frame of the movable sash and the sill of the fenestration unit frame when moving the movable sash into the closed position, wherein the second mechanical interlock restricts a leading end of the sill rail proximate the leading stile of the sash frame from moving away from the sill and towards the head jamb, and wherein the second mechanical interlock disengages when moving the movable sash from the closed position to the open position.

25. The method according to claim 24, wherein the first mechanical interlock engages before the second mechanical interlock when moving the movable sash from the open position to the closed position and wherein the second mechanical interlock disengages before the first mechanical interlock disengages when moving the movable sash from the closed position to the open position.

* * * * *